Aug. 19, 1924.

F. W. KUNSCHMAN

ADVERTISING DEVICE

Filed Feb. 14, 1923

1,505,151

Inventor

F. W. Kunschman,

By

Attorney

Patented Aug. 19, 1924.

1,505,151

UNITED STATES PATENT OFFICE.

FRED W. KUNSCHMAN, OF NEW YORK, N. Y.

ADVERTISING DEVICE.

Application filed February 14, 1923. Serial No. 618,998.

*To all whom it may concern:*

Be it known that FRED W. KUNSCHMAN, a citizen of the United States of America, residing at New York, in the county of New York and State of New York, has invented new and useful Improvements in Advertising Devices, of which the following is a specification.

The object of the invention is to provide an advertising device of the type serving to attract attention for example to a sign or a window display or the equivalent thereof by reason of the peculiarity or novelty of the effect on the vision of the casual observer; and with this object in view the invention consists in a construction and combination of parts of which a preferred embodiment is shown in the accompanying drawings, wherein:—

Figure 1:
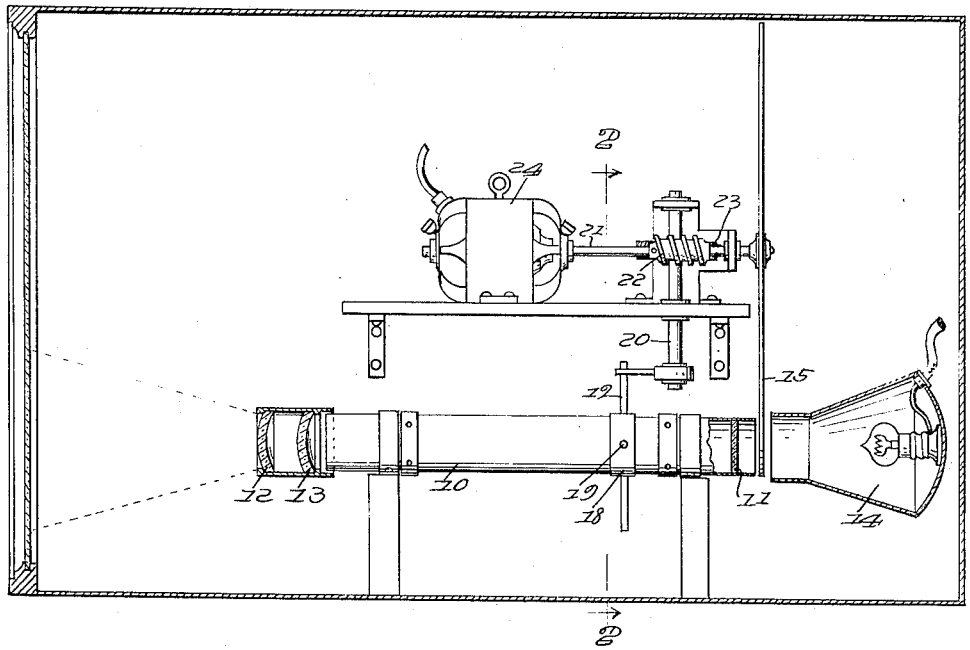
Figure 1 is a side view.
Figure 2:
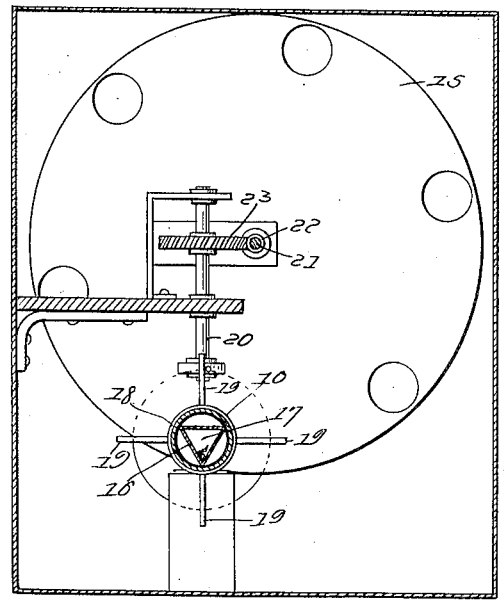
Figure 2 is a transverse sectional view on the plane indicated by the line 2—2 of Figure 1.

The device consists essentially of a diamond or tube 10 designed to project a beam or shaft of light supplied to the rear end thereof under the control of suitable lenses 11, 12 and 13 by a lighting unit 14 having an electrical or other source and interrupted at intervals, if desired, by means of a shutter 15.

The shaft of light from the source in passing through the barrel is further modified in the illustrated embodiment of the invention by passing through a kaleidoscopic tube consisting of the inwardly facing mirrors 16 arranged to form a cross-sectionally triangular chamber 17 between the lenses 12 and 13 and constituting a receptacle for relatively movable colored objects such as glass beads or fragments of colored glass, and to afford varity for the shaft of light which is modified by this kaleidoscopic tube to represent conventional designs in varying colors, there is also provided a means whereby the barrel may be rotated in a step by step or periodic manner as through the radially armed spider 18 secured to the barrel with its arms in the path of movement of a tappet arm 19 carried by the spindle 20 which receives its motion at a relatively low rate of speed from a motor shaft 21 through the worm 22 and gear 23. The shutter 15 may be of the rotary type as shown and arranged to be actuated by the motor shaft through any suitable speed reducing gearing. In the construction illustrated an electrical motor 24 is included but it will be understood that this is merely typical of means which may be employed in this connection for securing a periodic or step by step movement of the kaleidoscopic tube and a suitable actuation of the shutter, if the latter is desired, to periodically cut off or discontinue a shaft of light from the barrel.

Having described the invention, what is claimed as new and useful is:—

1. An apparatus for the purpose indicated having a revoluble barrel and means for directing a shaft of light therethrough, and a kaleidoscopic chamber arranged in and carried by said barrel in the path of the shaft of light passing therethrough, and means for imparting a step by step rotary movement to the barrel, in combination with means for periodically intercepting the shaft of light.

2. An apparatus for the purpose indicated having a revoluble barrel and means for directing a shaft of light therethrough, and a kaleidoscopic chamber arranged in and carried by said barrel in the path of the shaft of light passing therethrough, and means for imparting a step by step rotary movement to the barrel, in combination with means for periodically intercepting the shaft of light and consisting of a revoluble shutter.

In testimony whereof he affixes his signature.

FRED W. KUNSCHMAN.